United States Patent
Meyer et al.

(10) Patent No.: US 9,234,568 B2
(45) Date of Patent: Jan. 12, 2016

(54) MULTI SPEED TRANSMISSION

(71) Applicant: Caterpillar Inc., Peoria, IL (US)

(72) Inventors: Kevin G. Meyer, Germantown Hills, IL (US); James S. Rice, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 24 days.

(21) Appl. No.: 14/218,082

(22) Filed: Mar. 18, 2014

(65) Prior Publication Data

US 2015/0267780 A1    Sep. 24, 2015

(51) Int. Cl.
F16H 3/66    (2006.01)

(52) U.S. Cl.
CPC ... *F16H 3/66* (2013.01); *F16H 3/666* (2013.01); *F16H 2200/006* (2013.01); *F16H 2200/0086* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 7,037,232 B2 * | 5/2006 | Ishimaru | | 475/275 |
| 7,267,630 B2 * | 9/2007 | Tabata et al. | | 475/275 |
| 7,402,119 B2 * | 7/2008 | Kamada et al. | | 475/282 |
| 8,152,681 B2 * | 4/2012 | Seo et al. | | 475/269 |
| 8,333,675 B2 | 12/2012 | Phillips et al. | | |
| 8,376,895 B2 | 2/2013 | Saitoh et al. | | |
| 8,435,152 B2 | 5/2013 | Carey et al. | | |
| 8,480,533 B2 * | 7/2013 | Meyer et al. | | 475/276 |
| 8,517,885 B2 | 8/2013 | Shim et al. | | |
| 2013/0023376 A1 | 1/2013 | Hart et al. | | |
| 2013/0143709 A1 | 6/2013 | Kempf et al. | | |
| 2013/0150201 A1 | 6/2013 | Knox et al. | | |
| 2014/0004990 A1 | 1/2014 | Koch et al. | | |
| 2014/0057751 A1 * | 2/2014 | Mellet et al. | | 475/54 |

FOREIGN PATENT DOCUMENTS

| | | |
|---|---|---|
| DE | 102009020445 A1 | 11/2010 |
| DE | 102009031543 A1 | 1/2011 |
| DE | 102009047267 A1 | 6/2011 |
| JP | 2012-154393 A | 8/2012 |

* cited by examiner

Primary Examiner — Sherry Estremsky
(74) Attorney, Agent, or Firm — Baker & Hostetler LLP; Jeff A. Greene

(57) ABSTRACT

A multi-speed transmission includes a housing; an input member and an output member; four planetary gear trains including a first planetary gear train, a second planetary gear train, a third planetary gear train and a fourth planetary gear train, wherein each of the planetary gear trains includes a ring gear, a planetary carrier and a sun gear; and six control elements. Each of the six control elements is operatively connected to at least one of the planetary gear trains and selectively engageable to produce a set of different speeds between the input member and the output member. The set of different speeds includes eight forward speeds and two reverse speeds.

20 Claims, 6 Drawing Sheets

| RATIO | | STEP | | 1001 | 1002 | 1003 | 1004 | 1005 | 1006 |
|---|---|---|---|---|---|---|---|---|---|
| 1F | 5.88 | 1F/8F | 9.73 | | | X | | X | X |
| 2F | 3.17 | 1F/2F | 1.86 | X | | X | | | X |
| 3F | 2.22 | 2F/3F | 1.43 | X | | X | | X | |
| 4F | 1.64 | 3F/4F | 1.35 | X | X | X | | | |
| 5F | 1.36 | 4F/5F | 1.22 | | X | X | | X | |
| 6F | 1 | 5F/6F | 1.36 | | X | X | X | | |
| 7F | 0.73 | 6F/7F | 1.37 | X | | | X | X | |
| 8F | 0.61 | 7F/8F | 1.21 | | X | | X | X | |
| 1R | 5.75 | 1R/1F | 0.98 | | X | | | X | X |
| 2R | 2.71 | 1R/2R | 2.12 | X | X | | | | X |

*FIG. 2*

| RATIO | | STEP | | 2001 | 2002 | 2003 | 2004 | 2005 | 2006 |
|---|---|---|---|---|---|---|---|---|---|
| 1F | 5.88 | 1F/8F | 9.73 | X | | X | | | X |
| 2F | 3.17 | 1F/2F | 1.86 | | | X | | X | X |
| 3F | 2.22 | 2F/3F | 1.43 | X | | X | | X | |
| 4F | 1.64 | 3F/4F | 1.35 | | X | X | | X | |
| 5F | 1.36 | 4F/5F | 1.22 | X | X | X | | | |
| 6F | 1.00 | 5F/6F | 1.36 | | X | X | X | | |
| 7F | 0.73 | 6F/7F | 1.37 | X | | | X | X | |
| 8F | 0.61 | 7F/8F | 1.21 | X | X | | X | | |
| 1R | 5.75 | 1R/1F | 0.98 | X | X | | | | X |
| 2R | 2.71 | 1R/2R | 2.12 | | X | | | X | X |

*FIG. 4*

| RATIO | | STEP | | 3001 | 3002 | 3003 | 3004 | 3005 | 3006 |
|---|---|---|---|---|---|---|---|---|---|
| 1F | 5.88 | 1F/8F | 9.73 | | | X | | X | X |
| 2F | 3.17 | 1F/2F | 1.86 | X | | X | | | X |
| 3F | 2.22 | 2F/3F | 1.43 | X | | X | | X | |
| 4F | 1.64 | 3F/4F | 1.35 | X | X | X | | | |
| 5F | 1.36 | 4F/5F | 1.22 | | X | X | | X | |
| 6F | 1.00 | 5F/6F | 1.36 | | X | X | X | | |
| 7F | 0.73 | 6F/7F | 1.37 | X | | | X | X | |
| 8F | 0.61 | 7F/8F | 1.21 | | X | | X | X | |
| 1R | 5.75 | 1R/1F | 0.98 | | X | | | X | X |
| 2R | 2.71 | 1R/2R | 2.12 | X | X | | | | X |

*FIG. 6*

MULTI SPEED TRANSMISSION

TECHNICAL FIELD

This disclosure relates generally to multi-speed transmissions used in vehicles and machines, and more particularly to planetary multi-speed transmission systems.

BACKGROUND

Generally, a machine such as a vehicle, construction equipment, a mining machine, and the like is equipped with a transmission. The transmission may allow the machine to work at several different speeds so that the machine can perform various tasks effectively. Typically, the transmission includes a series of gears which are arranged to generate a certain range of speed.

Japanese Publication 2012-154393 (JP'393) to Shibamura discloses a transmission having four planetary gears with rotating and fixed clutches. The transmission in the JP'393 generates eight forward gear ratios. However, the gear arrangement in the transmission of JP'393 is not robust enough to provide larger overall gear ratios including multiple reverse gear ratios while maintaining a stable performance. Therefore, it is desirable to provide a planetary multi-speed transmission system to meet the performance criterion for use in industrial applications.

SUMMARY

The disclosure describes, in one embodiment, a multi-speed transmission including: a housing; an input member and an output member; four planetary gear trains including a first planetary gear train, a second planetary gear train, a third planetary gear train and a fourth planetary gear train, each of which includes a ring gear, a planetary carrier and a sun gear; and six control elements. Each of the six control elements is operatively connected to at least one of the planetary gear trains and selectively engageable to produce a set of different speeds between the input member and the output member. The set of different speeds includes eight forward speeds and two reverse speeds. The first planetary gear train is connected to the input member and at least two of the six control elements.

In another embodiment, the disclosure describes a multi-speed transmission including: a housing; an input member and an output member; four planetary gear trains including a first planetary gear train, a second planetary gear train, a third planetary gear train and a fourth planetary gear train each of which includes a ring gear, a planetary carrier and a sun gear where at least one planetary carrier in the transmission is a double-orbit planetary carrier; and six control elements. Each of the control elements is operatively connected to at least one of the planetary gear trains and selectively engageable to produce a set of different speeds between the input member and the output member. The set of different speeds includes eight forward speeds and two reverse speeds. The first planetary gear train is connected to the input member and at least two of the control elements.

In another embodiment, the disclosure describes a multi-speed transmission including a housing; an input member and an output member; exactly four planetary gear trains including a first planetary gear train, a second planetary gear train, a third planetary gear train and a fourth planetary gear train each of which includes a ring gear, a planetary carrier and a sun gear where at least one planetary carrier in the transmission is a double-orbit planetary carrier; and no more than six control elements. Each of the control elements is operatively connected to at least one of the planetary gear trains and selectively engageable to produce a set of different speeds between the input member and the output member. The set of different speeds includes eight forward speeds and two reverse speeds. The output member is connected to at least one planetary carrier in the transmission.

BRIEF DESCRIPTION OF THE DRAWINGS

FIG. 2 is a truth table identifying the engaged control elements, ratio reductions, and step ratios for each gear provided by the system of FIG. 1.

FIG. 4 is a truth table identifying the engaged control elements, ratio reductions, and step ratios for each gear provided by the system of FIG. 3.

FIG. 6 is a truth table identifying the engaged control elements, ratio reductions, and step ratios for each gear provided by the system of FIG. 5.

DETAILED DESCRIPTION

The disclosure relates to a planetary multi-speed transmission system. The system may include a plurality of planetary gear trains and a plurality of selectively engageable torque transmitting mechanisms or control elements and may provide at least eight forward and two reverse speeds or gear ratios. As used herein, the term "control element" may include clutches (which are alternatively referred to in the industry as rotational clutches), brakes (which are alternatively referred to in the industry as stationary clutches) or other torque control components that may conventionally be used in a transmission.

Figure 1:
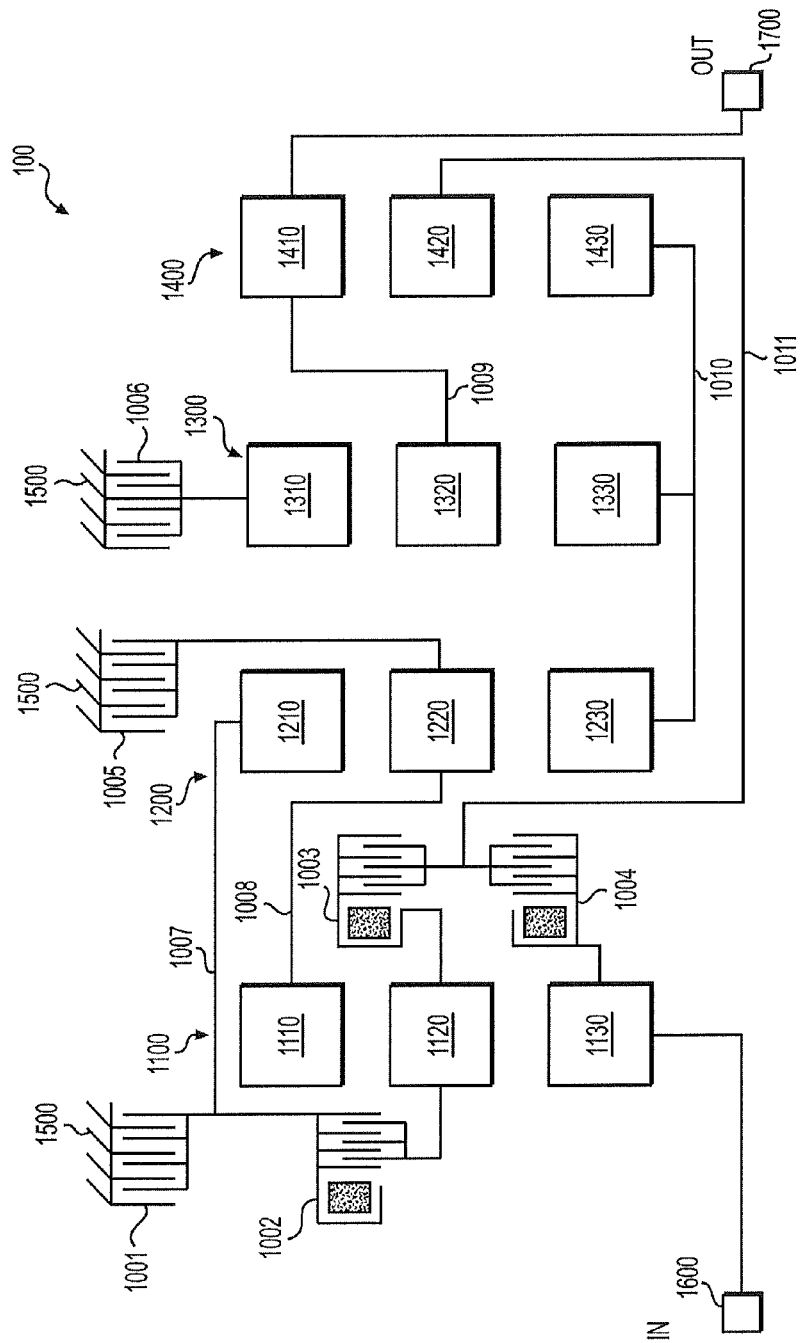
FIG. 1 is a schematic illustration of an exemplary planetary multi-speed transmission system in accordance with an embodiment of the disclosure.

An embodiment of the planetary multi-speed transmission system 100 is illustrated in FIG. 1. The system 100 may include four planetary gear trains 1100, 1200, 1300, 1400, which are arranged in sequential order in an axial direction or the direction of power flow along axis 1800. The first planetary gear train 1100 may include a first ring gear 1110, a first planetary carrier 1120 and a first sun gear 1130. The second planetary gear train 1200 may include a second ring gear 1210, a second planetary carrier 1220, and a second sun gear 1230. The third planetary gear train 1300 may include a third ring gear 1310, a third planetary carrier 1320, and a third sun gear 1330. Finally, the fourth planetary gear train 1400 may include a fourth ring gear 1410, a fourth planetary carrier 1420, and a fourth sun gear 1430.

The system 100 may further include a plurality of control elements including brakes and clutches operatively coupled to the planetary gear trains 1100, 1200, 1300, 1400 and selectively engageable to create a set of different gear ratios between the input member 1600 and the output member 1700. In FIG. 1, the system 100 may include three brakes 1001, 1005 and 1006 each of which may be connected to a housing 1500. The system 100 may include three clutches 1002, 1003 and 1004 each of which may be connected between rotatable components of the system 100. The system 100 may further include a plurality of intermediate coupling members connecting components of the planetary gear trains to control elements or components of other planetary gear trains. In FIG. 1, the system 100 may include intermediate coupling members 1007, 1008, 1009, 1010, 1011.

In FIG. 1, the planetary gear trains 1100, 1200, 1300, 1400 may be configured to obtain eight forward and two reverse speeds or gear ratios. The input member 1600 may be continuously connected to the first sun gear 1130. The first sun gear 1130 may be selectively connected to the intermediate coupling member 1011 by the clutch 1004 and then further connected to the fourth planetary carrier 1420 by the intermediate coupling member 1011. The first planetary carrier 1120 may be selectively connected to the second ring gear 1210 by the clutch 1002. The first planetary carrier 1120 may also be selectively connected to the intermediate coupling member 1011 by the clutch 1003 and further connected to the fourth planetary carrier 1420 by the intermediate coupling member 1011. The first ring gear 1110 may be continuously connected to the second planetary carrier 1220 by the intermediate coupling member 1008. The second planetary carrier 1220 may be selectively connected to the housing 1500 by the brake 1005.

The second ring gear 1210 may be selectively connected to the housing 1500 by the brake 1001. The second sun gear 1230, the third sun gear 1330 and the fourth sun gear 1430 may be continuously connected to each other by the intermediate coupling 1010. The third planetary carrier 1320 may be continuously connected to the fourth ring gear 1410 by the intermediate coupling member 1009. The fourth ring gear 1410 may be continuously connected to the output member 1700. The third ring gear 1310 may be selectively connected to the housing 1500 by the brake 1006.

In the configuration in FIG. 1, the ring gear/sun gear tooth ratio ($N_{ring}/N_{sun}$) of the first planetary gear train 1100 may be about 2.034. The ratio of the second planetary gear train 1200 may be about 2.377. The ratio of the third planetary gear train 1300 may be about 3.50. The ratio of the fourth planetary gear train 1400 may be about 2.728.

FIG. 2 shows a truth table of engagement combinations of the selectively engageable brakes, 1001, 1005, 1006 and clutches, 1002, 1003, 1004, which provide eight forward and two reverse speeds or gear ratios between the input member 1600 and the output member 1700. In the table, each of the selected brakes and clutches is denoted by the symbol, "X".

Figure 3:
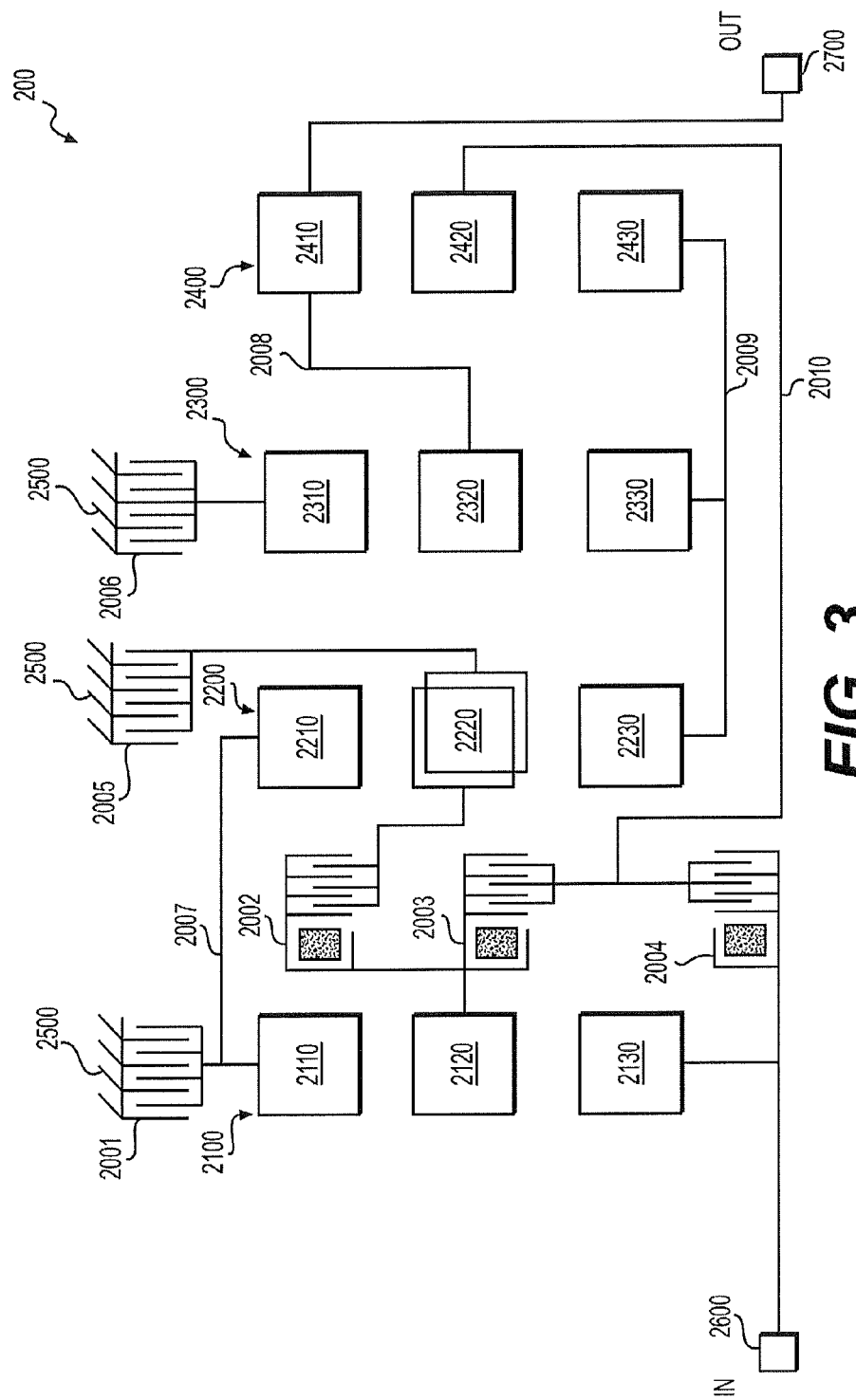
FIG. 3 is a schematic illustration of an exemplary planetary multi-speed transmission system in accordance with another embodiment of the disclosure.

Another embodiment of the planetary multi-speed transmission system 200 is illustrated in FIG. 3. The system 200 may include four planetary gear trains 2100, 2200, 2300, 2400, which are arranged in sequential order in an axial direction or the direction of power flow along axis 2800. The first planetary gear train 2100 may include a first ring gear 2110, a first planetary carrier 2120 and a first sun gear 2130. The second planetary gear train 2200 may include a second ring gear 2210, a second planetary carrier 2220, and a second sun gear 2230. The second planetary carrier 2220 may be a double-orbit planetary carrier. The third planetary gear train 2300 may include a third ring gear 2310, a third planetary carrier 2320, and a third sun gear 2330. Finally, the fourth planetary gear train 2400 may include a fourth ring gear 2410, a fourth planetary carrier 2420, and a fourth sun gear 2430.

The system 200 may further include a plurality of control elements including brakes and clutches operatively coupled to the planetary gear trains 2100, 2200, 2300, 2400 and selectively engageable to create a set of different speeds or gear ratios between the input member 2600 and the output member 2700. In FIG. 3, the system 200 may include three brakes 2001, 2005, 2006 each of which may be connected to a housing 2500. The system 200 may include three clutches 2002, 2003, 2004 each of which may be connected between rotatable components of the system 200. The system 200 may further include a plurality of intermediate coupling members connecting components of the planetary gear trains to control elements or components of other planetary gear trains. In FIG. 3, the system 200 may include intermediate coupling members 2007, 2008, 2009, 2010.

In FIG. 3, the gear trains 2100, 2200, 2300, 2400 may be configured to obtain eight forward and two reverse speeds or gear ratios. The first sun gear 2130 may be continuously connected to the input member 2600. The first sun gear 2130 may also be selectively connected to the intermediate coupling member 2010 by the clutch 2004 and further to the fourth planetary carrier 2420 by the intermediate coupling member 2010. The first planetary carrier 2120 may be selectively connected to the intermediate coupling member 2010 by the clutch 2003 and further to the fourth planetary carrier 2420 by the intermediate coupling member 2010. The first ring gear 2110 may be selectively connected to the housing 2500 by the brake 2001. The first ring gear 2110 may also be connected to the second ring gear 2210 by the intermediate coupling member 2007.

The second ring gear 2210 may be selectively connected to the housing 2500 by the brake 2001. The second planetary carrier 2220 may be selectively connected to the housing 2500 by the brake 2005. The second planetary carrier 2220 may also be selectively connected to the first planetary carrier 2120 by the clutch 2002. The second planetary carrier 2220 may be a double-orbit planetary carrier. The second sun gear 2230, the third sun gear 2330, and the fourth sun gear 2430 may be continuously connected to each other by the intermediate coupling member 2009. The third planetary carrier 2320 may be continuously connected to the fourth ring gear 2410 by the intermediate coupling member 2008. The fourth ring gear 2410 may be continuously connected to the output member 2700. The third ring gear 2310 may be selectively connected to the housing 2500 by the brake 2006.

In the configuration in FIG. 3, the ring gear/sun gear tooth ratio ($N_{ring}/N_{sun}$) of the first planetary gear train 2100 may be about 2.034. The ratio of the second planetary gear train 2200 may be about −3.377. The ratio of the third planetary gear train 2300 may be about 3.50. The ratio of the fourth planetary gear train 2400 may be about 2.728.

FIG. 4 shows a truth table of engagement combinations of the selectively engageable brakes, 2001, 2005, 2006 and clutches, 2002, 2003, 2004, which provide eight forward and two reverse speeds or gear ratios between the input member 2600 and the output member 2700. In the table, each of the selected brakes and clutches is denoted by the symbol, "X".

Figure 5:
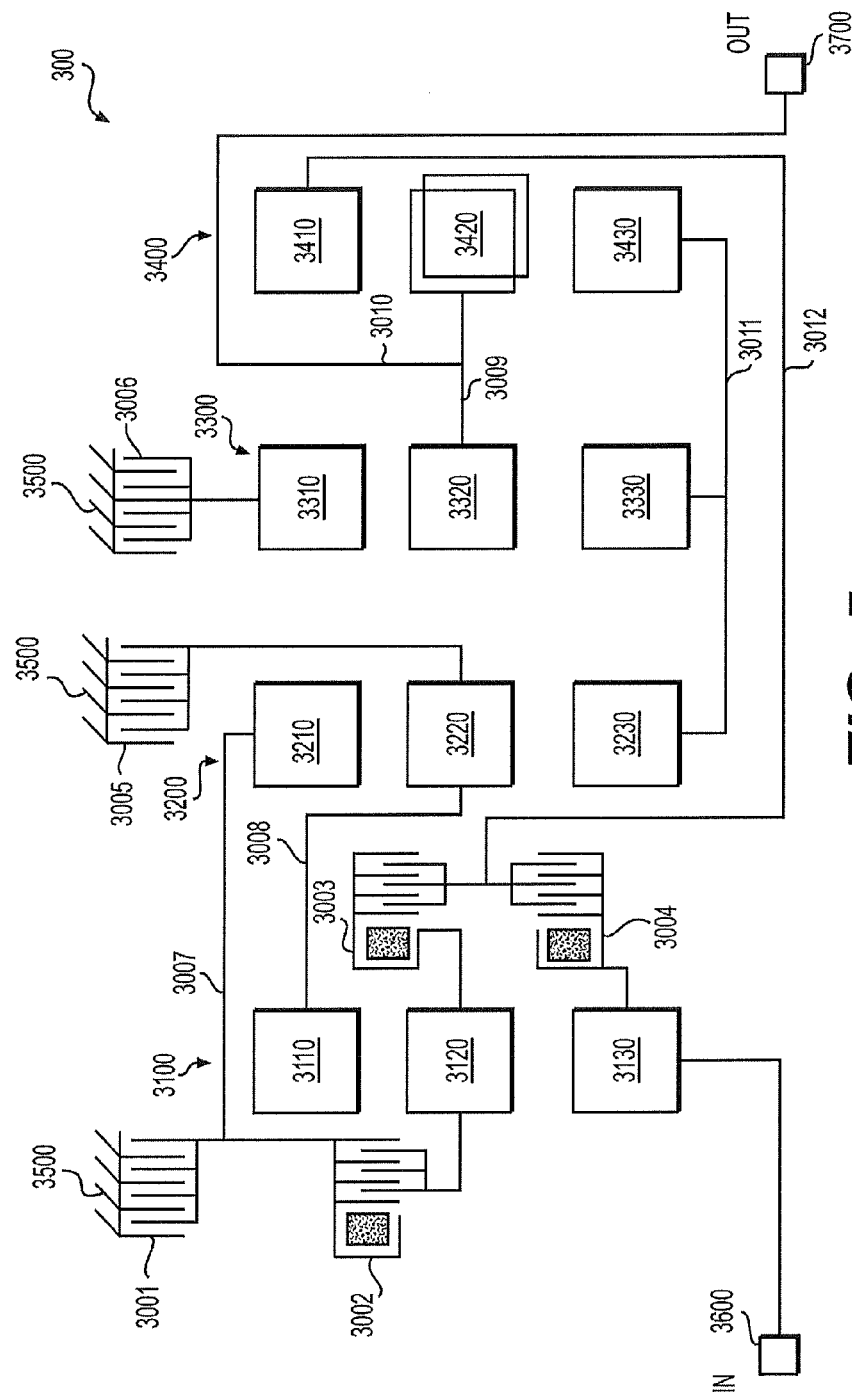
FIG. 5 is a schematic illustration of an exemplary planetary multi-speed transmission system in accordance with another embodiment of the disclosure.

Another embodiment of the planetary multi-speed transmission system 300 is illustrated in FIG. 5. The system 300 may include four planetary gear trains 3100, 3200, 3300, 3400, which are arranged in sequential order in an axial direction or the direction of power flow along axis 3800. The first planetary gear train 3100 may include a first ring gear 3110, a first planetary carrier 3120 and a first sun gear 3130. The second planetary gear train 3200 may include a second ring gear 3210, a second planetary carrier 3220, and a second sun gear 3230. The third planetary gear train 3300 may include a third ring gear 3310, a third planetary carrier 3320, and a third sun gear 3330. Finally, the fourth planetary gear train 3400 may include a fourth ring gear 3410, a fourth planetary carrier 3420, and a fourth sun gear 3430. The fourth planetary carrier 3420 may be a double-orbit planetary carrier.

The system 300 may further include a plurality of control elements including brakes and clutches operatively coupled to the planetary gear trains 3100, 3200, 3300, 3400 and selectively engageable to create a set of different speeds or gear ratios between the input member 3600 and the output member 3700. In FIG. 5, the system 300 may include three brakes 3001, 3005, 3006 each of which may be connected to a housing 3500. The system 300 may include three clutches 3002, 3003, 3004 each of which may be connected between rotatable components of the system 300. The system 300 may further include a plurality of intermediate coupling members connecting components of the planetary gear trains to control elements or components of other planetary gear trains. In FIG. 5, the system 300 may include intermediate coupling members 3007, 3008, 3009, 3010, 3011, 3012.

In FIG. 5, the first sun gear 3130 may be continuously connected to the input member 3600. In addition, the first sun gear 3130 may be selectively connected to the intermediate coupling member 3012 by the clutch 3004 and further connected to the fourth ring gear 3410. The first planetary carrier 3120 may be selectively connected to the second ring gear 3210 by the clutch 3002. Additionally, the first planetary carrier 3120 may be selectively connected to the intermediate coupling member 3012 by the clutch 3003 and further connected to the fourth ring gear 3410. The first ring gear 3110 may be continuously connected to the second planetary carrier 3220 by the intermediate coupling member 3008.

The second planetary carrier 3220 may be selectively connected to the housing 3500 by the brake 3005. The second ring gear 3210 may be selectively connected to the housing 3500 by the brake 3001. The second sun gear 3230, the third sun gear 3330 and the fourth sun gear 3430 may be continuously connected to each other by the intermediate coupling member 3011. The third planetary carrier 3320 may be connected to the fourth planetary carrier 3420 by the intermediate coupling member 3009 and may also connected to the output member 3700 by the intermediate coupling member 3010. The third ring gear 3310 may be selectively connected to the housing 3500 by the brake 3006. The fourth planetary carrier 3420 may be connected to the output member 3700 by the intermediate coupling member 3010. The fourth planetary carrier 3420 may be a double-orbit planetary carrier.

In the configuration in FIG. 5, the ring gear/sun gear tooth ratio ($N_{ring}/N_{sun}$) of the first planetary gear train 3100 may be about 2.034. The ratio of the second planetary gear train 3200 may be about 2.377. The ratio of the third planetary gear train 3300 may be about 3.50. The ratio of the fourth planetary gear train 3400 may be about −3.728.

FIG. 6 shows a truth table of combinations of engagements of the selectively engageable brakes, 3001, 3005, 3006 and clutches, 3002, 3003, 3004, which provide eight forward and two reverse speeds or gear ratios between the input member 3600 and the output member 3700. In the table, each of the selected brakes and clutches is denoted by the symbol, "X".

INDUSTRIAL APPLICABILITY

A multi-speed transmission according to the disclosure may be included in a machine. For example, an input member 1600 in FIG. 1 may connect the multi-speed transmission system 100 to a power source. The power source may be of any type that outputs power in a form usable by the multi-speed transmission system 100. For example, the power source may be an internal combustion engine (such as a diesel engine, a gasoline engine a turbine engine or a natural gas engine), an electric motor, or other device capable of generating a power output.

The multi-speed transmission embodiments disclosed herein include a plurality of planetary gear assemblies and clutch arrangements that provide relatively uniform and closely spaced speed intervals that enhance performance and shift quality. The transmission having at least eight forward and two reverse speeds or gear ratios in the disclosure provides many advantages including low gear torques, low component speeds, and low drag losses while maintaining a stable performance.

As shown in an exemplary embodiment in FIG. 1, the sun gears, 1130, 1230, 1330, 1430, planetary carriers 1120, 1220, 1320, 1420 and ring gears 1110, 1210, 1310, 1410 may all rotate together simultaneously. The change in rotational speed between the input member 1600 and the output member 1700 may depend on the configuration of the sun gears, ring gears, and planetary carriers.

As an example of the operation of the embodiment of the disclosed planetary multi-speed transmission system 100, reference will now be made to FIG. 2. FIG. 2 shows the truth table for eight forward gear ratios in a range of about 5.88:1 and 0.61:1 and two reverse gear ratios in a range of about 5.75:1 and 2.71:1 of the multi-speed transmission system 100. The symbol "X" denotes selective arrangement of a particular control element.

The first forward gear (1F) may be selected by engaging the clutch 1003 to connect the first planetary carrier 1120 to the fourth planetary carrier 1420 by the intermediate coupling member 1011, thereby setting the first planetary carrier 1120 and the fourth planetary carrier 1420 at the same speed. Simultaneously, the brake 1005 may be engaged to connect the housing 1500 to the second planetary carrier 1220 and to the first ring gear 1110 through the intermediate coupling member 1008. The brake 1006 may also be engaged to connect the housing 1500 to the third ring gear 1310. The first forward gear (1F) configuration may provide a gear ratio of about 5.88.

A shift from the first forward gear (1F) to the second forward gear (2F) may be accomplished by disengaging the brake 1005 and instead engaging the brake 1001 to connect the second ring gear 1210 to the housing 1500 through the intermediate coupling member 1007. The clutch 1003 may remain being engaged to connect the first planetary carrier 1120 to the fourth planetary carrier 1420 through the intermediate coupling member 1011. Simultaneously, the brake 1006 may be engaged to connect the third ring gear 1310 to the housing 1500. The second forward gear (2F) configuration may provide a gear ratio of about 3.17. The step ratio from the first forward gear (1F) to the second forward gear (2F) in this configuration may be about 1.86.

A shift from the second forward gear (2F) to the third forward gear (3F) may be accomplished by disengaging the brake 1006 and instead engaging the brake 1005 to connect the housing 1500 to the second planetary carrier 1220 and to the first ring gear 1110 through the intermediate coupling member 1008. The clutch 1003 may remain being engaged to connect the first planetary carrier 1120 to the fourth planetary carrier 1420 through the intermediate coupling member 1011. The brake 1001 may remain being engaged to connect the second ring gear 1210 to the housing 1500 through the intermediate coupling member 1007. The third forward gear (3F) configuration may provide a gear ratio of about 2.22. The step ratio from the second forward gear (2F) to the third forward gear (3F) in this configuration may be about 1.43.

A shift from the third forward gear (3F) to the fourth forward gear (4F) may be accomplished by disengaging the brake 1005 and instead engaging the clutch 1002 to connect the first planetary carrier 1120 to the second ring gear 1210 through the intermediate coupling member 1007. The clutch 1003 may remain being engaged to connect the first planetary carrier 1120 to the fourth planetary carrier 1420 through the intermediate coupling member 1011. The brake 1001 may remain being engaged to connect the second ring gear 1210 to the housing 1500 through the intermediate coupling member 1007. The fourth forward gear (4F) configuration may provide a gear ratio of about 1.64. The step ratio from the third forward gear (3F) to the fourth forward gear (4F) in this configuration may be about 1.35.

A shift from the fourth forward gear (4F) to the fifth forward gear (5F) may be accomplished by disengaging the brake 1001 and instead engaging the brake 1005 to connect the housing 1500 to the second planetary carrier 1220 and to the first ring gear 1110 through the intermediate coupling member 1008. The clutch 1003 may remain being engaged to connect the first planetary carrier 1120 to the fourth planetary carrier 1420 through the intermediate coupling member 1011. The clutch 1002 may also remain being engaged to connect the first planetary carrier 1120 to the first ring gear 1210 through the intermediate coupling member 1007. The fifth forward gear (5F) configuration may provide a gear ratio of about 1.36. The step ratio from the fourth forward gear (4F) to the fifth forward gear (5F) in this configuration may be about 1.22.

A shift from the fifth forward gear (5F) to the sixth forward gear (6F) may be accomplished by disengaging the brake 1005 and instead engaging the clutch 1004 to connect the first sun gear 1130 to the fourth planetary carrier 1420 through the intermediate coupling member 1011. The clutch 1003 may remain being engaged to connect the first planetary carrier 1120 to the fourth planetary carrier 1420 through the intermediate coupling member 1011. The clutch 1002 may also remain being engaged to connect the first planetary carrier 1120 to the second ring gear 1210 through the intermediate coupling member 1007. The sixth forward gear (6F) configuration may provide a gear ratio of about 1. The step ratio from the fifth forward gear (5F) to the sixth forward gear (6F) in this configuration may be about 1.36.

A shift from the sixth forward gear (6F) to the seventh forward gear (7F) may be accomplished by disengaging the clutch 1002 and the clutch 1003 and instead engaging the brake 1001 and the brake 1005. The brake 1001 may connect the second ring gear 1210 to the housing 1500 through the intermediate coupling member 1007. The brake 1005 may connect the housing 1500 to the second planetary carrier 1220 and to the first ring gear 1110 through the intermediate coupling member 1008. The clutch 1004 may remain being engaged to connect the first sun gear 1130 to the fourth planetary carrier 1420 through the intermediate coupling member 1011. The seventh forward gear (7F) configuration may provide a gear ratio of about 0.73. The step ratio from the sixth forward gear (6F) to the seventh forward gear (7F) in this configuration may be about 1.37.

A shift from the seventh forward gear (7F) to the eighth forward gear (8F) may be accomplished by disengaging the brake 1001 and instead engaging the clutch 1002 to connect the first planetary carrier 1120 to the second ring gear 1210 through the intermediate coupling member 1007. The clutch 1004 may remain being engaged to connect the first sun gear 1130 to the fourth planetary carrier 1420 through the intermediate coupling member 1011. The brake 1005 may also remain being engaged to connect the housing 1500 to the second planetary carrier 1220 and to the first ring gear 1110 through the intermediate coupling member 1008. The eighth forward gear (8F) configuration may provide a gear ratio of about 0.61. The step ratio from the seventh forward gear (7F) to the eighth forward gear (8F) in this configuration may be about 1.21.

The first reverse speed or gear (1R) may be selected by engaging the clutch 1002 to connect the first planetary carrier 1120 to the second ring gear 1210 through the intermediate coupling member 1007. Simultaneously, the brake 1005 may be engaged to connect the housing 1500 to the second planetary carrier 1220 and to the first ring gear 1110 through the intermediate coupling member 1008. The brake 1006 may also be engaged to connect the housing 1500 to the third ring gear 1310. The first reverse gear (1R) configuration may provide a gear ratio of about 5.75.

A shift from the first reverse gear (1R) to the second reverse gear (2R) may be accomplished by disengaging the brake 1005 and instead engaging the brake 1001 to connect the second ring gear 1210 to the housing 1500 through the intermediate coupling member 1007. The clutch 1002 may remain being engaged to connect the first planetary carrier 1120 to the second ring gear 1210 through the intermediate coupling member 1007. The brake 1006 may also remain being engaged to connect the housing 1500 to the third ring gear 1310. The second reverse gear (2R) configuration may provide a gear ratio of about 2.71. The step ratio from the first reverse gear (1R) to the second reverse gear (2R) in this configuration may be about 2.12.

The embodiment of the planetary multi-speed transmission system 100 shown in FIG. 1 may include additional and/or alternative gear configurations and yet be within the scope of the disclosure. For example, operation of the embodiments of the planetary multi-speed transmission system 200, 300 are shown in FIG. 3 and FIG. 5. The corresponding truth tables are shown in FIG. 4 and FIG. 6. Like the truth table of FIG. 2, described in detail herein, the truth tables of FIG. 4 and FIG. 6 depict the combinations of clutches and brakes to establish eight forward and two reverse gear ratios.

The disclosure is applicable to machines that incorporate a multi-speed transmission. For example, the disclosure may be incorporated in trucks and other heavy construction and mining machines requiring certain gearing requirements met by the disclosure. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitations as to the scope of the disclosure generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods describe herein can be performed in any suitable order unless otherwise indicated herein or otherwise clearly contradicted by context.

Accordingly, it will be apparent to those skilled in the art that various modifications and variations can be made in the disclosed transmission assemblies without departing from the scope of the disclosure. Other embodiments of the disclosed transmission will be apparent to those skilled in the art from consideration of the specification and practice of the transmission disclosed herein. It is intended that the specification and examples be considered as exemplary only, with a true scope of the disclosure being indicated by the following claims and their equivalents.

We claim:

1. A multi-speed transmission comprising:
a housing;
an input member and an output member;
four planetary gear trains comprising a first planetary gear train, a second planetary gear train, a third planetary gear train and a fourth planetary gear train, wherein each of the planetary gear trains comprises a ring gear, a planetary carrier and a sun gear;
an intermediate coupling member continuously connecting the sun gear of the second, third and fourth planetary gear sets; and
six control elements, wherein each of the six control elements is operatively connected to at least one of the planetary gear trains and selectively engageable to produce a set of different speeds between the input member and the output member, and wherein the set of different speeds includes eight forward speeds and two reverse speeds wherein the first planetary gear train is connected to the input member and at least two of the six control elements.

2. The multi-speed transmission according to claim 1, wherein the transmission is configured to engage at least three control elements at each of the speeds.

3. The multi-speed transmission according to claim 1, wherein the six control elements comprise three rotatable clutches and three brakes.

4. The multi-speed transmission according to claim 1, wherein the sun gear of the first planetary gear train is continuously connected to the input member.

5. The multi-speed transmission according to claim 1, wherein the planetary carrier of the first planetary gear train is selectively connected to two clutches.

6. The multi-speed transmission according to claim 1, wherein the ring gear of the third planetary gear train is connected to a brake.

7. The multi-speed transmission according to claim 1, further comprising a plurality of intermediate coupling members wherein each of the intermediate coupling members is configured to be connected with at least any one of the following ring gears, planetary carriers and sun gears in the transmission.

8. A multi-speed transmission comprising:
a housing;
an input member and an output member;
four planetary gear trains comprising a first planetary gear train, a second planetary gear train, a third planetary gear train and a fourth planetary gear train wherein each of the planetary gear trains comprises a ring gear, a planetary carrier and a sun gear, wherein at least one planetary carrier in the transmission is a double-orbit planetary carrier;
an intermediate coupling member continuously connecting the sun gear of the second, third and fourth planetary gear sets; and
six control elements, wherein each of the control elements is operatively connected to at least one of the planetary gear trains and selectively engageable to produce a set of different speeds between the input member and the output member, wherein the set of different speeds includes eight forward speeds and two reverse speeds; and wherein the first planetary gear train is connected to the input member and at least two of the control elements.

9. The multi-speed transmission according to claim 8, wherein the transmission is configured to engage at least three control elements at each of the speeds.

10. The multi-speed transmission according to claim 8, wherein the control elements comprise three rotatable clutches and three brakes.

11. The multi-speed transmission according to claim 8, wherein the sun gear of the first planetary gear train is continuously connected to the input member.

12. The multi-speed transmission according to claim 8, wherein the planetary carrier of the first planetary gear train is connected to two clutches.

13. The multi-speed transmission according to claim 8, wherein the ring gear of the third planetary gear train is connected to a brake.

14. The multi-speed transmission according to claim 8, further comprising a plurality of intermediate coupling members where each of the intermediate coupling members is configured to be connected with at least any one of the following ring gears, planetary gears and sun gears in the transmission.

15. The multi-speed transmission according to claim 8, wherein the planetary carrier of the second planetary gear train is the double-orbit planetary carrier.

16. A multi-speed transmission comprising:
a housing;
an input member and an output member;
exactly four planetary gear trains comprising a first planetary gear train, a second planetary gear train, a third planetary gear train and a fourth planetary gear train wherein each of the planetary gear trains comprises a ring gear, a planetary carrier and a sun gear, wherein at least one planetary carrier in the transmission is a double-orbit planetary carrier;
an intermediate coupling member continuously connecting the sun gear of the second, third and fourth planetary gear sets; and
no more than six control elements, wherein each of the control elements is operatively connected to at least one of the planetary gear trains and selectively engageable to produce a set of different speeds between the input member and the output member, wherein the set of different speeds includes eight forward speeds and two reverse speeds; and wherein the output member is connected to at least one planetary carrier in the transmission.

17. The multi-speed transmission according to claim 16, wherein the planetary carrier of the first planetary gear train is connected to two control clutches.

18. The multi-speed transmission according to claim 16, wherein the ring gear of the third planetary gear train is connected to a brake.

19. The multi-speed transmission according to claim 16, further comprising a plurality of intermediate coupling members where each of the intermediate coupling members is configured to be connected with at least any one of the following ring gears, planetary carriers and sun gears in the transmission.

20. The multi-speed transmission according to claim 16, wherein the planetary carrier of the fourth planetary gear train is the double-orbit planetary carrier.

* * * * *